United States Patent [19]

Freuler

[11] 4,068,360
[45] Jan. 17, 1978

[54] PRESS ROLL WITH BENDING CONTROL DEVICE

[76] Inventor: Fred H. Freuler, Bannlistrasse, Riedholz, Switzerland

[21] Appl. No.: 734,045

[22] Filed: Oct. 20, 1976

[30] Foreign Application Priority Data

Oct. 24, 1975 Switzerland .................. 13820/75

[51] Int. Cl.² .............................................. B21B 13/02
[52] U.S. Cl. .................................................. 29/116 AD
[58] Field of Search ...... 29/113 AD, 116 AD, 113 R, 29/116 R; 100/162 B

[56] References Cited

U.S. PATENT DOCUMENTS

| | | | |
|---|---|---|---|
| 710,327 | 9/1902 | Kling | 29/113 R |
| 2,648,122 | 8/1953 | Hornbostel | 29/113 AD |
| 3,050,829 | 8/1962 | Appenzeller | 29/116 AD X |
| 3,295,188 | 1/1967 | Saueressig | 29/113 R |
| 3,460,221 | 8/1969 | Korsch | 29/113 R |
| 3,470,948 | 10/1969 | Korsch | 29/113 AD X |
| 3,633,493 | 1/1972 | Helminen | 29/113 AD X |

FOREIGN PATENT DOCUMENTS

1,151,778  7/1963  Germany .................... 29/113 AD

*Primary Examiner*—Alfred R. Guest
*Attorney, Agent, or Firm*—Roylance, Abrams, Berdo & Kaul

[57] ABSTRACT

A press roll having a shaft, a cylindrical shell and axially arranged support devices mounted on the shaft to exert radial forces on the shell in opposition to pressing forces to prevent shell distortion. Ducts in the shaft convey fluid under pressure to the support devices each of which includes an annular chamber defined by annular radially extending walls with peripheral axial flanges, an annular compressible and flexible ring and seals to keep the fluid from leaving the chamber. Various embodiments of the annular rings and seals are disclosed. Pivot bearings prestress the system and support the shell on the shaft for relative eccentric rotation.

13 Claims, 14 Drawing Figures

PRESS ROLL WITH BENDING CONTROL DEVICE

The invention relates to a press roll with bending control device, with a roll shell for receiving the pressing power acting thereon, and with a supporting shaft arranged within the roll shell but mounted outside the roll shell and supporting and rotating therewith, whereby the bending control device is fitted on the supporting shaft having a plurality of supporting devices which can be supplied with fluid under pressure to exert a force counter to the pressing force.

BACKGROUND OF THE INVENTION

In the case of press rolls the requirement is generally justly made that a constant line pressure can be set over the entire width of a roll gap in a wide line pressure range. Such conditions are required by the paper, textile, plastic and other industries, because non-uniform line pressures in the pressing gap can very easily reduce the quality of the product and impair the productivity of the machines. However, it is very difficult to maintain these conditions because these rolls which rotate on bearings outside the roll body elastically bend in the direction of the resultant external forces and therefore a uniform line pressure is only possible if very strictly defined conditions are fulfilled; otherwise special precautions must be taken. The requirement that the line pressures must be adjustable within a wide range are not fulfilled by the presently known constructional solution.

German Offenlegungsschriften 1,940,175 discloses a structure in which a roll for the pressure treatment of flat materials has a roll core, a cylindrical roll shell coaxial thereto and inflating members which can be filled with pressure medium located between the same, with the inflating members being constructed as sealable chambers surrounding the roll core, and wherein the roll shell and roll core can be rotated in the same direction and with substantially the same angular velocity. A disadvantage of this construction is that in the case of a change of the contact surface of the inflating members, the vertical bearing capacity thereof also changes.

SUMMARY OF THE INVENTION

An object of the present invention is to return to the priniple of the press roll with a rotary supporting shaft with a traditional outside bearing in order to reduce the mechanical expenditure, simplify operation and increase the efficiency of this type of machine.

A further object of the invention is to provide a press roll in which individual annular chambers develop a uniform vertical bearing capacity independently of the vertical load.

Briefly described, the invention includes a press roll having bending control apparatus comprising a substantially cylindrical roll shell having an outer surface for receiving pressing forces and an inner surface, a supporting shaft extending through and rotatable with said shell, means outside of said shell for rotatably supporting said shaft, a plurality of supporting devices longitudinally arranged on said shaft for exerting outward forces on said shell relative to said shaft in opposition to said pressing forces, a source of fluid under pressure, means in said shaft defining a plurality of ducts for supplying fluid under pressure from said source to said supporting devices, each of said supporting devices comprising an elastically compressible and flexible annular member radially movable relative to said shell and said shaft, means on said shaft for limiting the radial outward movement of said annular member to a position in which the maximum outward expansion of said member relative to the axis of said shaft is a position in which the distance between the axis of said shaft and the outer surface of said member is substantially equal to the inner radius of said shell, means on said shaft for limiting axial movement of said annular member, said member, said means for limiting outward movement and said means for limiting axial movement forming a continuous annular chamber around said shaft connected to receive fluid from one of said ducts, and sealing means for preventing outflow of fluid from said chamber, whereby said fluid under pressure exerts forces through said annular members on the inner surface of said shell such that the orientation of the resultant forces produced by each of said supporting devices remains unchanged as said shell rotates.

BRIEF DESCRIPTION OF THE DRAWINGS

In order that the manner in which the foregoing and other objects are attained in accordance with the invention can be understood in detail, particularly advantageous embodiments thereof will be discribed with reference to the accompanying drawings which form a part of this specification, and wherein.

Figure 1:
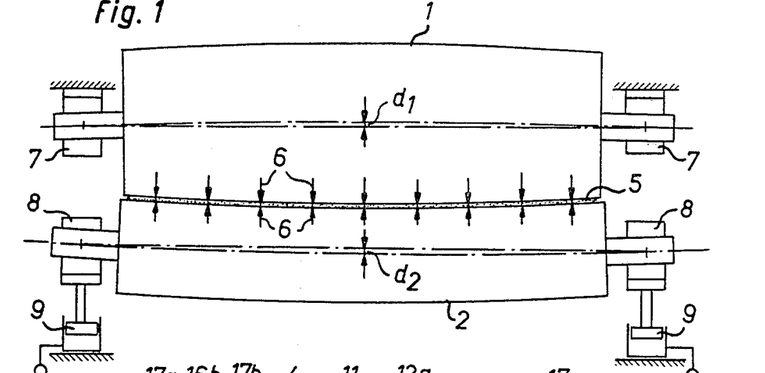
FIG. 1 is a schematic view of a conventional press roll arrangement without a bending compensation device, with a first roll having a curved surface which engages with a second parallel, cylindrical roll.

FIG. 1 shows a conventional prior art press roll arrangement which will be discussed to point out the problems solved by the present invention. An upper press roll 1 with a curved surface and a cylindrical press roll 2 are pressed against one another in order to process the material 5 passing between rolls 1 and 2. The pressing power acting on the material is partly produced by the specific gravities and bending resistances of the two rolls which, depending on the arrangement, acts totally or only partly in the positive or the negative sense or in the case of a horizontal arrangement does not act at all. The other part of the pressing force is produced by the contact pressures exerted by the cylinder and piston units 9 arranged on either end of roll 2. The cylinder and piston units are subject to operational control and, directly or via a lever arrangement, press upwardly against bearings 8 and therefore against the lower roll 2, which is freely vertically movable in guides, against the fixed upper roll 1. The resulting forces 6 on the rolls lead to sagging or bending effects illustrated at $d_1$ and $d_2$ which would make uniform line pressures over the width of the rolls impossible, unless compensated for by the curvature of one or both of the rolls. The necessary magnitude and geometrical configuration of the curvature are calculated according to the known laws of mechanics, taking into account the design of the individual rolls, the relative arrangement thereof and the desired pressing power. Assuming correct calculation of the bending or sag, an arrangement of this type can ensure a substantially uniform line pressure over the entire width for a particular preselected pressure. However, such constructions have shortcomings, because the differences in the diameter resulting from the curvatures lead to differences in the circumferential speeds over the width of the rolls and possibly between the two roll surfaces, which can have disadvantageous effects on the quality of the material pressed. Account must also be taken of the fact that, as a result of the indicated curvature, it is only possible to have a very restricted pressure range about a given nominal value. It is not possible to adapt the pressures to different process conditions of the materials to be pressed. When the pressure is changed, the only possibility available is to replace the rolls by others with a different curvature.

This disadvantage is eliminated by the press roll according to the invention. It can cooperate with an identical roll as shown at in FIG. 2 or with a conventional opposite roll 3 according to FIGS. 3 and 4.

Figure 2:
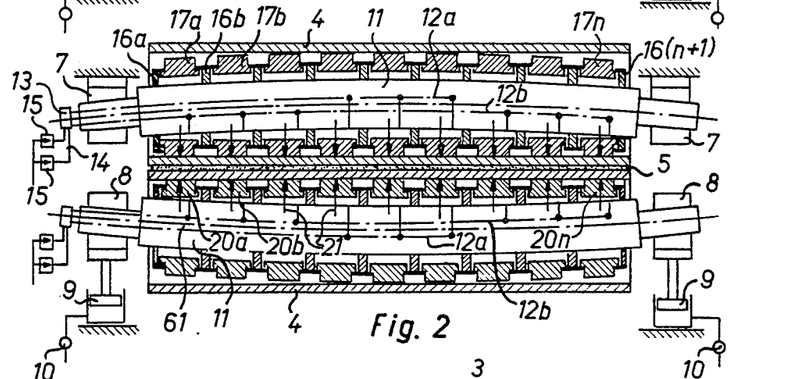
FIG. 2 is a schematic front elevation view, in longitudinal section, of a press roll arrangement with two bending-control rolls in accordance with the invention.

The general construction of the press roll according to the invention will first be described with reference to FIGS. 2-4. A supporting shaft 11 extends through each roll and is rotatably supported in bearings 8. Within each shaft there is provided a supply duct for hydraulic fluid. FIGS. 2 and 4 show two such ducts 12a, 12b, and FIG. 3 also shows a third duct 12c. Duct 12c extends over the entire length of supporting shaft 11, including the length of one journal, whereas the other ducts 12a and 12b only extend over part of the length of supporting shaft 11. From each of supply ducts 12a, 12b and 12c radial bores extend to the surface of supporting shaft 11. The hydraulic or pneumatic fluid, preferably compressed air, passes through ducts 12 via a rotary fluid inlet 13, connected to stationary lines 14 in which pressure regulators 15 are provided.

The bending control device is fitted on supporting shaft 11 between the shaft and the roll shell 4, arranged concentrically around the shaft, and comprises supporting devices 16, 17 and 23 for the roll shell 4, the supporting devices being either directly juxtaposed or arranged at preselected intervals on the supporting shaft 11, depending on the pressure requirements. Each individual supporting device can be viewed as comprising two axially spaced, annular holding back or restraining means 16 arranged on the supporting shaft, and an intermediately located, radially movable, annular members or rings 17. Together, these define and limit an annular chamber 20 which surrounds and tightly seals the supporting shaft. The radial expansion of each elastically flexible and compressible annular chamber limiting member 17 is limited in its outward radial movement by the holding back means 16, which constitute radial movement limiting means, so that the maximum radial spacing between supporting shaft axis 61 and the peripheral supporting surface of said limiting member 17 remains uniform over the entire periphery, even at different pressures and substantially corresponds to the inner radius of the roll shell. To this end the holding back means 16 have coaxial annular holding back flanges 18 (FIG. 5) on which can engage the adjacent ends of the annular chamber limiting members constructed as annular or circular shoulders 19. In order to provide an all-around sealing of the annular chamber against loss of fluid, even during the radial movements of the annular chamber limiting member within the lateral holding back means, packing members are arranged between said annular chamber lifting member and said holding back means, in a manner to be described hereinafter.

Into each of the annular chambers 20 issue feed ducts, which can comprise a combination of concentric bores 12a, 12b and 12c through the supporting shaft; radial bores 12r which extend to the surface of the supporting shaft; and longitudinal slots 12n in the surface of the shaft.

The operating principle of the bending control device can best be explained relative to the lower press roll 4 in FIG. 2. It is first assumed that the two pressure regulators 15 have the same setting, so that the same pressure is obtained in the feed ducts 12a and 12b. Due to the displacement of the roll body relative to the supporting shaft on the loading side, the annular chamber limiting members 17 are pushed into the annular chambers connected with the hydraulic fluid supply. The complete supporting force of the hydraulic fluid, which was first absorbed by the shoulders 19 of the annular chamber limiting member via the flanges 18 of the holding back means following the separation of said shoulders from said flanges, now acts via the peripheral supporting surfaces of the annular chamber limiting member directly on the inside of the roll shell 4.

Since on the one the fluid pressures, the internal dimensions of the annular chambers and their spacings relative to one another are the same, so that the supporting force is constant over the entire width, while on the other hand it is loaded by a second roll body of identical construction design and pressure conditions with a constant pressure over the entire width, the actions and torques acting on each of the two roll shells are cancelled out at all points and bending stresses and sagging do not occur. Very small elastic deformations of the ring-shaped cross-sections of the roll shells are possible because, viewed in longitudinal section, the load is punctiform (i.e., at points along a line) and the inner support semi-circular in transverse section. However, due to their limited size, such deformations are of no significance to the correct operation of the bending control device.

However, it must not be ignored that through the supporting forces of the supporting members arranged in rows and acting discontinuously over the roll width on the one hand and the resisting forces of the material being pressed acting continuously over the roll width on the other, bending and shear stresses occur in the roll shell between the supporting members, viewed in a longitudinal section. The roll shell wall thickness to supporting member spacing relationship must not therefore drop below a particular value and, by calculating the static mechanics, is selected in such a way that the deformations having this origin can also be ignored. However, it may be desirable to vary these compressive forces over the width of the roll shell 4, because it may occur that the material 5 to be pressed has to be treated differently at right angles over its width. This can be achieved in a simple manner by selecting appropriate different settings of pressure regulators 15. Viewed in the longitudinal direction the bending resistance of the roll shell assists in ensuring that the line pressure transitions between the supporting members of one pressure and the supporting members of another pressure take place gradually and not in abrupt steps.

The grouping of the supporting members to pressure zones symmetrical about the center of the roll width with the possibility of using different fluid pressures is particularly important for the combination between a bending-controlled roll 4 and a roll or normal construction 3 (FIGS. 3 and 4) and without curvature.

As already stated hereinbefore, the bending curves of paired press roll bodies of normal construction 3 resulting from the pressing power are such that the line pressure in the center of the width is always smaller than at the ends. Even a pressing arrangement with a roll of normal construction engaged with a bending-controlled roll with the same fluid pressure over the entire width would still not lead to uniform line pressure over the entire width. The line pressures would have a maximum at the roll ends and would be approximately zero in the center. In such a combination (FIGS. 3 and 4), the bending controlled roller must be operated such that roll shell 4, on loading, does not maintain the linear surface lines as in FIG. 2, but instead said roller shell, together with the roll body of normal construction 3, bend in the same direction. This possibility is brought about by a corresponding increase in the pressures in ducts 12b and 12c, and therefore in the annular chambers connected thereto, of the central zone. The possible extent of this bending of roll surface 4 is dependent not only on the signs of the pressure differences, but also substantially on the bending resistance of said shell.

This arrangement for closely engaging a bending controlled roll body with a bending roll of normal construction can lead to uniform line pressures or variable line pressures over the roll width, depending on the selection of the pressures and as shown in FIG. 2.

Figure 4:
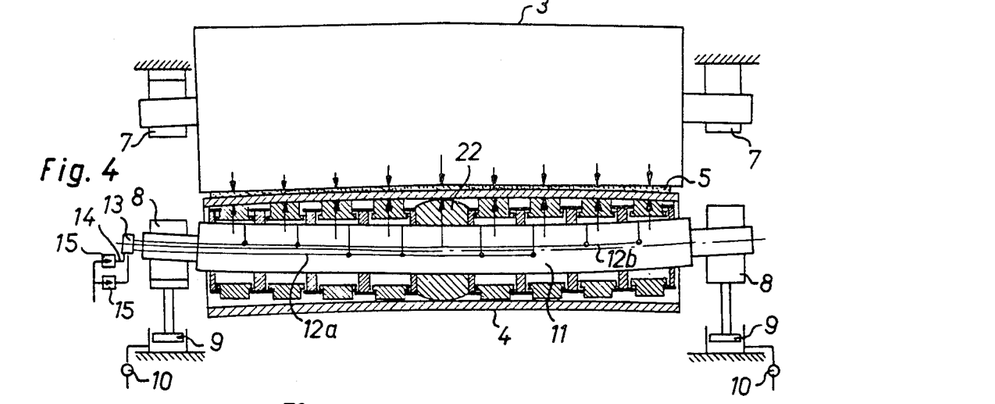
FIG. 4 is a schematic front elevation view of a further press roll arrangement similar to that of FIG. 3, but with a single bending-controlled roll with a fixed bearing located in the center.
Figure 5:
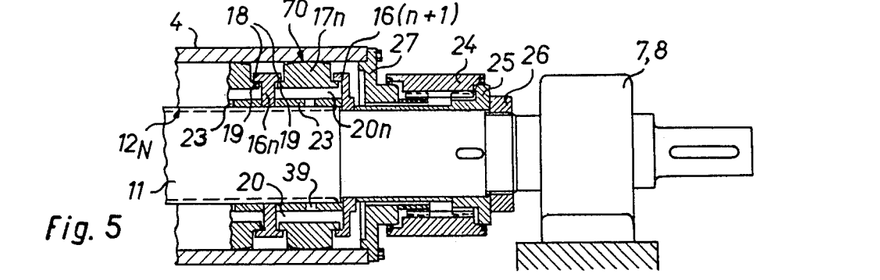
FIG. 5 is a partial front view in longitudinal section through a roll end.

A construction according to FIG. 5 has certain disadvantages in cases where an increased compensation bending action is required of the bending-controlled roll, due to the high flexibility of the opposite roll of normal construction. The construction of FIG. 4 also permits simple variations of the line pressures distributed over the width with only a single feed duct and therefore only a unitary pressure zone. This is brought about by corresponding coincidence of the two fluid pressures, i.e., the fluid pressure in the annular chamber supporting members eing the same as the fluid chamber in the contact pressure cylinder 9 acting via the outside bearing.

Thus, for example, in the case of a high contact pressure cylinder pressure and moderate annular chamber fluid pressure, the bending is precisely the opposite to that of the above-indicated embodiment, because in such a case the compressive force of bearing 22 is larger than the remaining forces and the roll shell 4 sags towards its two ends, as shown in FIG. 4. If the fluid pressure of the annular chambers is increased, a linear course of the upper surface lines is initially obtained and in the case of a further increase, a course complementary to that shown is obtained, i.e., the ends of roll shell 4 are raised most and pressed against the material to be pressed.

Details of the bending control device are shown on a larger scale in FIG. 5, which shows the right-hand roll end. Each annular chamber 20, of which only annular chamber 20n is shown, is limited on its inside by a sleeve 23 drawn onto the shaft, the sleeve 23 having one or more bores 39 for the free inflow and outflow of the pressure fluid.

FIG. 5 also shows the fitting of a coupling, which is desired in order to ensure a force-locked synchronism of supporting shaft 11 and roll shell 4. The flexible coupling 24 is mounted on one end of the supporting shaft 11, whereon a coupling shaft flange 25 is secured by means of a nut 26, which indirectly also prestresses the holding back means 16 and the spacer sleeves 23. The other side of the coupling 24 engages with a coupling flange 27 which is fixed to the roll shell 4. In this case a flexible coupling is shown, due to the small displacement between the centers of supporting shaft 12 and roll shell 4, which displacements are repeated with every revolution.

Figure 3:
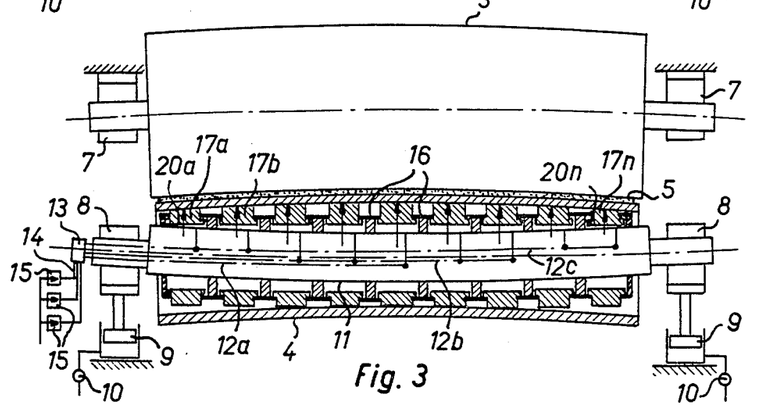
FIG. 3 is a schematic front elevation view of a press roll arrangement with a first cylindrical roll engaged with a second bending-control roll, in partial section.
Figure 6:
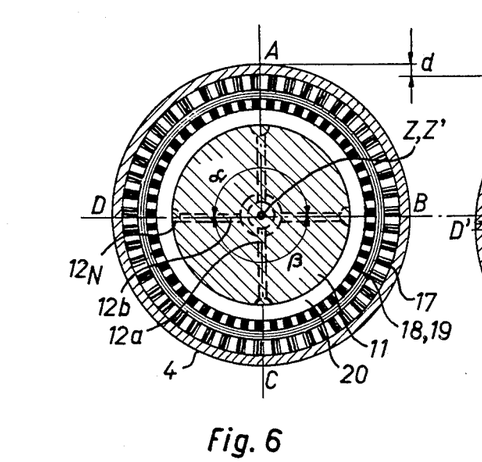
FIGS. 6 and 6a are end elevations in section through the same roll in the unloaded and loaded states respectively.
Figure 6A:
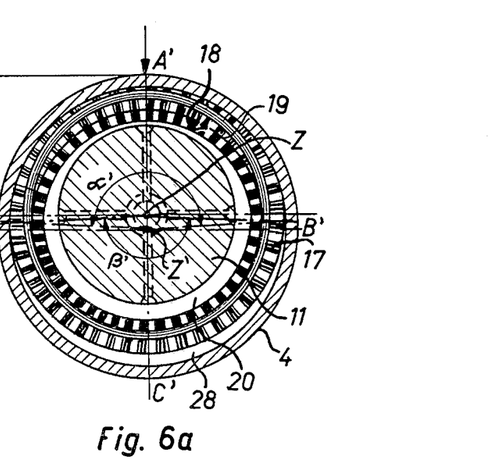

The operation of the bending control device which has already been described in conjunction with FIGS. 2 to 4 will be more clearly understood by referring to FIGS. 6 and 6a, which are schematic sections through the bending control roll at a point close to one or the other roll end. In FIG. 6, it is assumed that no external force acts on press roll 2. Roll shell 4 is therefore concentric to supporting shaft 11 and therefore concentric to each of the holding back flanges 16. The annular chamber limiting member 17, whose annular shape is clearly visible, is also in a concentric position to supporting shaft 11 and correspondingly annular chamber 20 has a uniform cross-section around its periphery. The angle of curvature $a$, through which the correspondingly annular chamber limiting member 17 engages on roll shell 4, and the angle of curvature $b$, through which the shoulders 19 engage with the holding back flanges 18 of the holding back means, amounts substantially to 180° in each case.

FIG. 6a shows the displacement of roll shell 4 relative to supporting shaft 11 caused by loading from above, with the displacment distance $d$ being indicated between FIGS. 6 and 6a. The holding back flanges 18 maintain their concentric position relative to supporting shaft 11, because they form part of the particular holding back means 16. However, the annular chamber limiting memnber 17 is now pushed downwards by roll shell 4 into annular chamber 20, leading to a cross-sectional reduction of annular chamber 20, which is also clearly shown in FIGS. 2 to 4 at the end of the press roll. It should be noted that this pressure only acts in that peripheral half of the annular chamber lifting member 17 or in that area on the roll shell inner surface which is exposed to the pressure on the press roll, i.e., in area D' - A' - B'.

In the lower half, namely in area B' - C' - D', the annular chamber limiting member 17 cannot change its position, i.e., it cannot move downwards because it is prevented from so doing by the holding back flange 18. Since, however, roll shell 4 is displaced downwards as an inflexible unit, it is separated from the annular chamber limiting member 17, so that a space 28 is formed there.

Due to the fact that, unlike roll shell 4, annular chamber limiting member 17 cannot move downwards, it follows that it must shorten its circumference, i.e., it is uniformly compressed during the loaded rotation. The amount of total shortening substantially equals double the displacement of supporting shaft 11 in the downwards direction, i.e., is equal to twice $d$. As can be seen from FIGS. 6a, member 17 only engages in this half on the roll shell, so that the load transfer substantially only takes place in this half which is directly exposed to the load. In addition, the center of curvature Z' of limiting member 17 migrates downwards in the upper half with that of roll shell 4, while the center of curvature for the lower half coincides with the center of curvature Z of the supporting shaft. The elastic annular chamber limiting member 17 must therefore substantially assume the shape of two arcs with oppositely displaced centers. Thus, there is also a change of curvature in the area of points D' and B' which, with the roll shell rotating, leads to a constant bending of the concurrently rotating member 17 at these points. Thus, member 17 must be both elastically compressible and flexible. Correspondingly, the angle of curvature $\alpha$, i.e., the angle of contact between roll shell 4 and member 17 is shortened to angle $\alpha'$, while the angle of curvature $\beta$, i.e., the angle of contact between member 17 and holding back means 16 is shortened to angle $\beta'$.

The following drawings show how such an annular chamber limiting member 17 can be constructed in order to satisfy these requirements, and how the requirements of absolute sealing of the associated annular chamber 20 and the precise maintaining of a maximum spacing between the peripheral supporting surface 70 and the supporting shaft axis 61 (FIG. 10) must be simultaneously satisfied, even in the case of variations of the fluid pressures.

Figure 7:
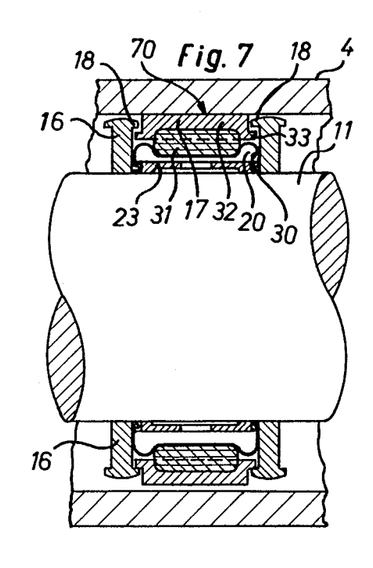
FIG. 7 is a partial front elevation in partial longitudinal section through a first embodiment of a supporting device in the loaded state with a fixed-mounted diaphragm hydraulic fluid seal and with supporting shoe members arranged in a ring.
Figure 7A:
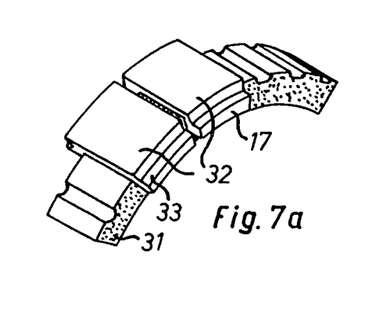
FIG. 7a is a perspective view of a portion of an annular chamber limiting structure according to the embodiment of FIG. 7.

According to FIGS. 7 and 7a, a circular diaphragm 30 is provided with its lateral edges anchored in the lateral edges of sleeve 23 and the midportion extending upwards or radially outwardly on either side along the holding back means 16 and extends across the inner surfaces of a ring 31, which on its outside has supporting shoes 32 and together with the latter forms the annular chamber limiting member 17. In accordance with the above requirement regarding elastic bending and compressibility, ring 31 is made from an elastomeric material such as rubber or elastic plastic material, and the supporting shoes 32 in the uncompressed state must not be placed too close together on ring 31. The supporting shoes, which are preferably metallic, serve on the one hand to transfer force to roll shell 4 and on the other hand have annular shoulders which engage with the holding back flanges 18 without bending under the action of the fluid pressure, which would not be possible if the annular chamber limiting member 17 was made entirely from elastic material.

Figure 8:
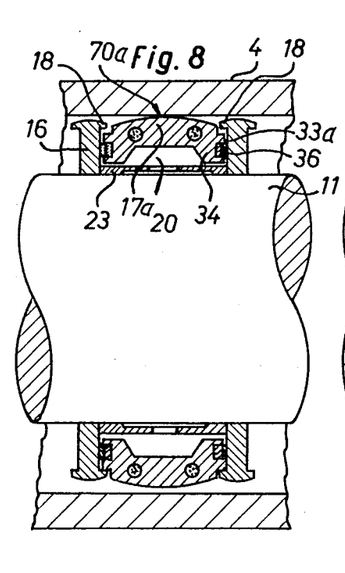
FIG. 8 is a partial front elevation in partial longitudinal section through a second embodiment of a supporting device in the loaded state with a hydraulic fluid seal sliding in the radial and rotation direction.
Figure 8A:
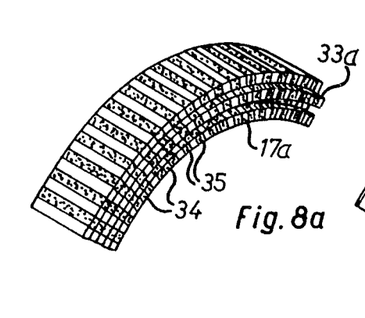
FIG. 8a is a perspective view of a portion of an annular chamber limiting member according to FIG. 8.

According to FIGS. 8 and 8a, the annular chamber limiting member 17a comprises individual radially directed metallic segments 34, which serve to transfer force to the inner surface of the shell and ensure the strict limiting of the spacing relative to the supporting shaft axis. Elastic intermediate layers 35 made from rubber or an elastic plastic material, which permit the bending are interposed between members 34. Annular shoulders 33a substantially correspond to the previous example. For sealing purposes a sliding packing member 36 is provided on either side which permits free radial movements and rotational movements. The latter is very important because constant circumferential speeds of the circumferentially shortened annular chamber limiting member leads to a slightly increased angular velocity, which leads to an advancing or leading of said annular chamber limiting member relative to the two holding back rings.

Figure 9:
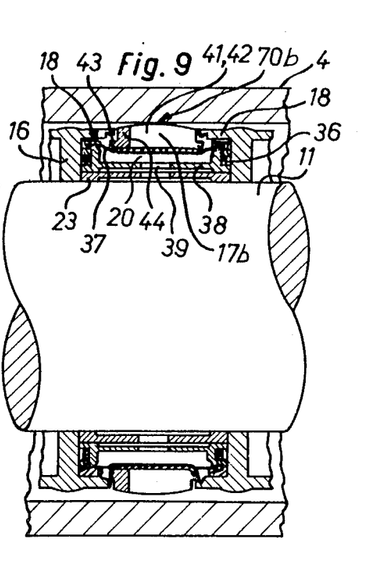
FIG. 9 is a partial front elevation in longitudinal section through a third embodiment of a supporting device in the loaded state with a diaphragm hydraulic fluid seal for the radial movements fixed to a sleeve which rotates freely with sliding packing members.
Figure 9A:
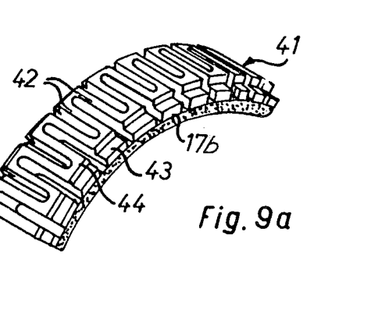
FIG. 9a is a perspective view of a portion of an annular chamber lifting member according to FIG. 9.

According to FIGS. 9 and 9a, as in FIGS. 7 and 7a, a generally annular diaphragm 37 is provided. However, it is secured in the lateral edges of a sleeve 38 which is U-shaped in cross-section and which is freely rotatable relative to sleeve 23 and surrounds the latter, and is provided with a radial passage opening 39 for the pressure fluid. Here again a sliding packing member 36 is provided to seal against fluid which could escape between the two sleeves 23 and 38.

In this embodiment, the annular chamber lifting member comprises an annular spring 41, which in turn comprises axially extending juxtaposed cross members 42, having a limited spacing relative to one another and with circularly extending connecting portions 44 having annular shoulders 43. A meander-shaped or sinuous construction of circular spring 41 results from the transition points 44 between cross members 42, together with the cross members. The transition points 44 are made particularly thin, in order to ensure both the necessary bending and also the compressibility of the annular chamber limiting member. The inner surface of the circular spring is here coated with a layer of an elastomeric material such as rubber or an elastic plastic material, so that the thin diaphragm pressed against this surface is not damaged during operation by the constantly moving circular spring parts.

Figure 10:
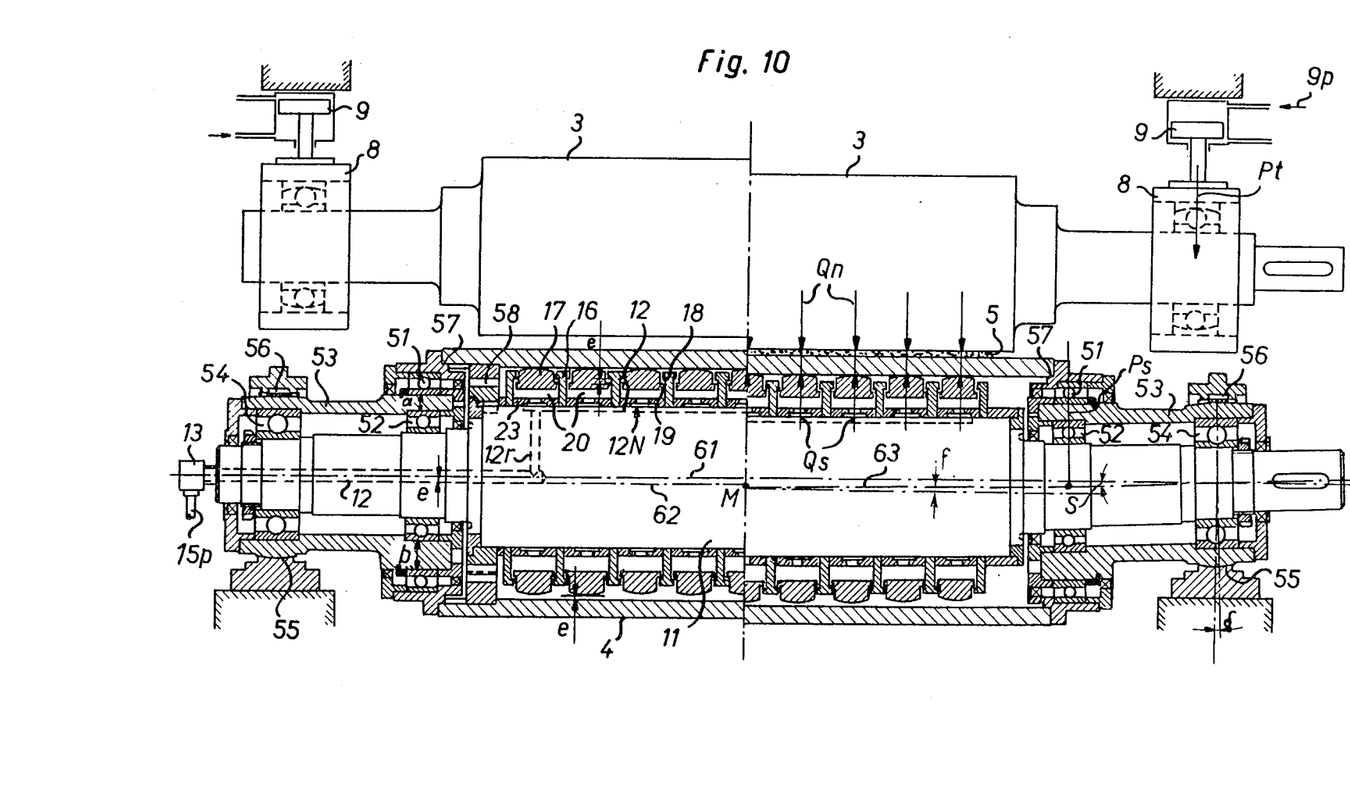
FIG. 10 is a front elevation in longitudinal section through a further embodiment of a bending-controlled roll with additonal lateral roll shell pivot bearings.

Finally, FIG. 10 shows a construction which has certain advantages for application where there is a tendency for the roll shell to vibrate at high speeds and under circumstances wherein there are large, local, regularly repeating differences in the thickness of the material 5 to be pressed. The embodiment of FIG. 10 comprises a bending compensation device constituted by supporting devices of the same construction and arrangement described hereinbefore and located between the supporting shaft 11 and the roll shell 4 placed around the latter. However, it differs from the previous bending control rolls due to the arrangement of additional pivot bearings 51 and 52 close to the lateral ends of roll shell 57. Pivot bearings 52 are arranged concentrically on supporting shaft 11 with the outer race of each bearing 52 bearing against the interior of one end of a non-rotary sleeve 53. The other ends of sleeves 53 contain the actual main bearing 54 of the rotary supporting shaft 11. Sleeves 53 transfer the load of supporting shaft 11 to fixed bearings 55 which are provided with ball seats. In this case the ball seats are necessary so that the angle of inclination S of the bending supporting shaft 11 can be freely obtained. Sleeve 53 is prevented from rotating by wedges 56 between sleeve 53 and fixed bearing 55. On the sides of these sleeves facing the center of the roll and, advantageously, in the same transverse plane as the sleeve inner bearing 52, they each carry a further pivot bearing 51, which supports the lateral ends 57 of roll shell 4.

The sleeve inner bearing 52 and the sleeve outer bearing 51 are arranged eccentrically to one another, this eccentricity being provided by the eccentric bore in the end of sleeve 53 as indicated by the different thicknesses $a$ and $b$ at the left end of FIG. 10. This arrangement of the two pivot bearings leads to an eccentric arrangement between roll shell 4 and supporting shaft 11 which rotates therewith, the eccentricity being denoted by the quantity $e$. In the represented example $e = (\frac{1}{2})(b-a)$. As the eccentricity of this mounting results from the special construction of the fixed sleeve 53, the orientation thereof remains unchanged during the rotation of the roll, unless sleeve 53 must be adapted to a new roll arrangement by rotating to a different solid angle within fixed bearing 55. The spatial orientation of the eccentricity is aligned in such a way that a straight connecting line through the centers of the circles of the eccentrically arranged pivot bearings coincides with the total loading direction resulting from the shell weight and the external loading. In this connection the side of the eccentricity is directed counter to the loading direction at which the roll gap containing the supporting devices reaches the minimum dimension.

Therefore, the annular chamber limiting members 17 on the loading side are pushed into annular chamber 20 before there is an external loading by the quantity $e$ of the eccentricity and, 180° away from the opposite side urged away from the roll shell inner surface, are raised by the same quantity $e$.

Without any supply of pressure fluid the roll behaves in a similar manner to a roll 2 of conventional construction. If an external load Pt occurs in the indicated direction, the roll body will attempt to escape the load Qn by bending in the manner indicated hereinbefore. When pressurized fluid is supplied, a direct zonal supporting force Qs is produced acting in uniformly distributed manner on the roll shell over the roll width. This force can be adjusted, as required, by selecting the uniformly provided fluid pressure and is carried by the supporting shaft. If the effects of the loads Ps of the lateral roll shell pivot bearings 51 and 52 exceed those of the fluidcontrolled supporting forces Qs, the line pressures are higher towards the sides than in the center of the roll width. However, if the effects of the fluid supporting forces Qs are disproportionately higher than the lateral roll shell loads Ps, the line pressures at the center of the roll width are accentuated. The matching of the line pressure pattern according to operating requirements takes place in a simple manner by the reciprocal matching of the contact pressure cylinder pressures 9p on the one hand and the supporting device hydraulic pressures 15p on the other hand.

FIG. 10 shows the left-hand half of the bending-controlled roll in the unloaded state. The different positions of the annular chamber limiting member circular shoulders 19 relative to the holding back flanges 18 on the upper side (nearest to the loading direction) compared with the lower side (remote from the loading direction) are clearly visible). In this case supporting shaft 11 rotates about the upper axis 61 and the roll shell 4 rotates about the lower axis 62.

In the right-hand half the bending-controlled roll is shown in the loaded state. For reasons of clarity, here again the bent axis 63 of the loaded supporting shaft 11 is shown on a greatly increased scale. This drawing clearly shows that in order to function correctly, the eccentricity $e$ must be at least the same or somewhat higher than that part of the maximum expected bend or sag $f$ of the supporting shaft, occurring between the lateral roll shell pivot bearings point S and the roll center point M, as well as including the amount of the necessary prebending of the roll shell for cases where additional compensation is necessary for the bending of effects of an opposite roll 3 of conventional construction.

The left-hand half of the roll further shows a design of a gear coupling 58 which connects roll shell 4 in torque-locked manner with the supporting shaft while permitting the relatively small axial displacements of the coupled rotary parts about the eccentricity $e$.

While certain advantageous embodiments have been chosen to illustrate the invention, it will be understood by those skilled in the art that varius changes and modifications can be made therein without departing from the scope of the invention as defined in the appended claims.

What is claimed is:

1. A press roll having bending control apparatus comprising a substantially cylindrical roll shell having an outer surface for receiving pressing forces and an inner surface;

a supporting shaft extending through and rotatable with said shell;

means outside of said shell for rotatably supporting said shaft;

a plurality of supporting devices longitudinally arranged on said shaft for exerting outward forces on said shell relative to said shaft in opposition to said pressing forces;

a source of fluid under pressure;

means in said shaft defining a plurality of ducts for supplying fluid under pressure from said source to said supporting devices, each of said supporting devices comprising an elastically compressible and flexible annular member radially movable relative to said shell and said shaft, means on said shaft for limiting the radial outward movement of said annular member to a position in which the maximum outward expansion of said member relative to the axis of said shaft is a position in which the distance between the axis of said shaft and the outer surface of said member is substantially equal to the inner radius of said shell, means on said shaft for limiting axial movement of said annular member, said member, said means for limiting outward movement and said means for limiting axial movement forming a continuous annular chamber around said shaft connected to receive fluid from one of said ducts, and sealing means for preventing outflow of fluid from said chamber, whereby said fluid under pressure exerts forces through said annular members on the inner surface of said shell such that the orientation of the resultant forces produced by each of said supporting devices remains unchanged as said shell rotates.

2. A press roll according to claim 1 wherein
said means for limiting axial movement includes annular walls extending radially from said shaft;
said annular members include annular shoulder means formed at the axial edges thereof; and said means for limiting radial movement includes axially extending annular flanges near the outer peripheral edges of said walls, said flanges being engageable with said shoulder means for limiting radial movement.

3. A press roll according to claim 1 wherein
said means for limiting axial movement includes annular walls extending radially from said shaft;
each of said annular members includes a substantially continuous portion and a plurality of shoe segments adhered to said portion,
each of said shoe segments having a shoulder formed at its axial ends;
said means for limiting radial movement includes annular axially extending flanges extending around the periphery of each of said walls, said flanges engaging said shoulders when said shoes are in their outermost radial positions.

4. A press roll according to claim 1 wherein each of said annular members includes
an elastic ring, and
a plurality of shoe members adhered to said ring and facing outwardly toward said shell.

5. A press roll according to claim 1 wherein each of said annular members includes
a plurality of radially exending metal segments, and
a plurality of elastic layers interposed between said metal segments and attached thereto.

6. A press roll according to claim 1 wherein each of said annular members includes
a plurality of spaced apart axially extending segments and
a plurality of circularly extending portions interconnecting alternate ends of adjacent ones of said segments to form a generally sinuous annular spring member,
said circularly extending portions being then to ensure elasticity and compressibility of said member.

7. A press roll according to claim 1 wherein said sealing means includes
an annular diaphragm in said annular chamber having a generally U-shaped cross-section opening radially inwardly, and
means for holding the edges of said diaphragm radially inwardly of said means for limiting outward movement.

8. A press roll according to claim 7 wherein each of said means for holding includes
an annular sleeve within said annular chamber and extending axially between adjacent ones of said means for limiting axial movement;
sliding packing ring means attached to the peripheral edges of said sleeve, said packing ring means being in sliding contact with said means for limiting axial movement for sealing said chamber against outflow of fluid.

9. A press roll according to claim 1 wherein each of said annular members includes
sliding packing ring members attached to the axial edges of said annular member and extending entirely around the periphery thereof, said packing members being in sliding contact with said means for limiting axial movement for sealing the chamber portions inwardly thereof and permitting radial and rotational movement of said annular member.

10. A press roll according to claim 1 wherein
each of said plurality of ducts is connected to at least one of said chambers,
and wherein said source of fluid under pressure is a source of compressed air capable of supplying air at various pressures.

11. A press roll according to claim 1 and further comprising
a substantially rigid annular ring mounted on said shaft at its midpoint and extending radially outwardly to the inner surface of said shell for supporting the center of said shell in a substantially inflexible manner.

12. A press roll according to claim 1 and further comprising
first and second pivot bearing means at each end of said shell for supporting said shell relative to said shaft;
a sleeve between said first and second bearing means, said sleeve having a generally annular wall having an eccentric bore therein;
whereby said shell is eccentrically supported relative to said shaft.

13. A press roll according to claim 12 wherein the amount of said eccentricity is chosen to cause said supporting devices to be precompressed along one radial plane of said press roll in the absence of pressing forces by at least the quantity of the expected total of the loading sag of said shaft and shell.

* * * * *